(12) United States Patent
Ammann et al.

(10) Patent No.: US 7,370,427 B2
(45) Date of Patent: May 13, 2008

(54) TILTABLE CONSTRUCTION LASER

(75) Inventors: Manfred Ammann, Lauterach (AT);
Heinz Kousek, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/388,744

(22) Filed: Mar. 24, 2006

(65) Prior Publication Data

US 2006/0242850 A1 Nov. 2, 2006

(30) Foreign Application Priority Data

Apr. 29, 2005 (DE) ...................... 10 2005 000 048

(51) Int. Cl.
G01B 11/26 (2006.01)
G01C 5/00 (2006.01)

(52) U.S. Cl. .................... 33/290; 33/DIG. 21

(58) Field of Classification Search ............... 33/290, 33/291, 292, DIG. 21
See application file for complete search history.

(56) References Cited

U.S. PATENT DOCUMENTS

| 5,485,266 | A | * | 1/1996 | Hirano et al. .................. 33/291 |
|---|---|---|---|---|
| 5,539,990 | A | | 7/1996 | Le |
| 5,689,330 | A | * | 11/1997 | Gerard et al. .................. 33/291 |
| 5,839,199 | A | * | 11/1998 | Ogawa ........................ 33/291 |
| 5,852,493 | A | * | 12/1998 | Monnin ....................... 33/291 |
| 6,138,367 | A | * | 10/2000 | Raby .......................... 33/290 |
| 6,449,856 | B1 | * | 9/2002 | Matsumoto et al. ... 33/DIG. 21 |
| 6,493,952 | B1 | * | 12/2002 | Kousek et al. ......... 33/DIG. 21 |
| 6,675,489 | B2 | * | 1/2004 | Ohtomo et al. ............... 33/290 |
| 6,804,892 | B1 | | 10/2004 | Yung et al. |
| 7,059,058 | B2 | * | 6/2006 | Kousek et al. ................ 33/290 |
| 2003/0229997 | A1 | * | 12/2003 | Gamal et al. ................. 33/290 |
| 2004/0107589 | A1 | * | 6/2004 | Ohtomo et al. ............... 33/290 |
| 2006/0090357 | A1 | * | 5/2006 | Wuersch et al. .............. 33/290 |

FOREIGN PATENT DOCUMENTS

| DE | 4406914 A1 | 9/1995 |
|---|---|---|
| DE | 10325859 B3 | 6/2004 |

* cited by examiner

Primary Examiner—G. Bradley Bennett
(74) Attorney, Agent, or Firm—Abelman, Frayne & Schwab

(57) ABSTRACT

A construction laser with at least one laser beam (4) defining a plane (3) has a laser unit (6) which is tiltable with respect to a housing (5) around at least one swiveling axis (9a) and includes at least one leveling sensor (10a) which is sensitive to the swiveling axis (9a) for a highly precise orientation to the gravitational field (G), and at least one tilt sensor (11a) which is sensitive to the swiveling axis (9a) for direct measurement of an inclination angle [alpha] relative to the gravitational field (G).

9 Claims, 2 Drawing Sheets

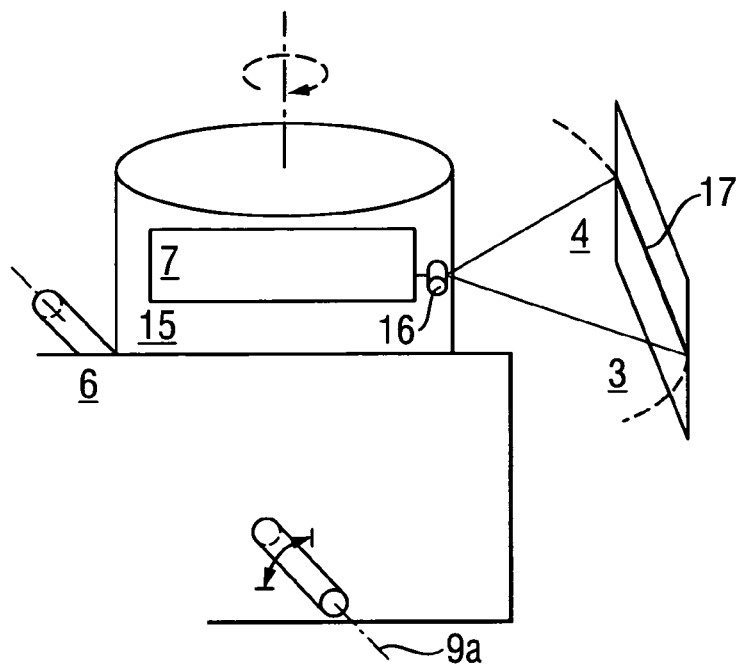
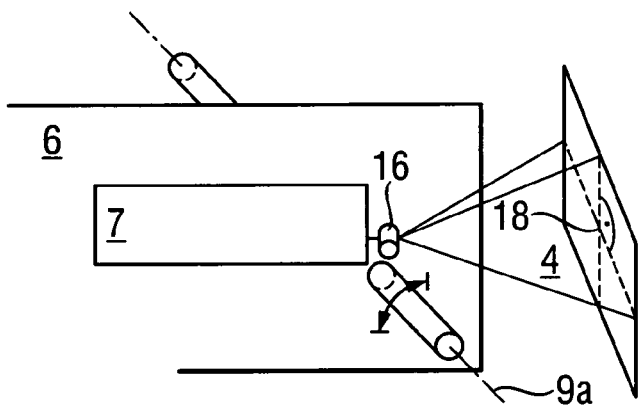
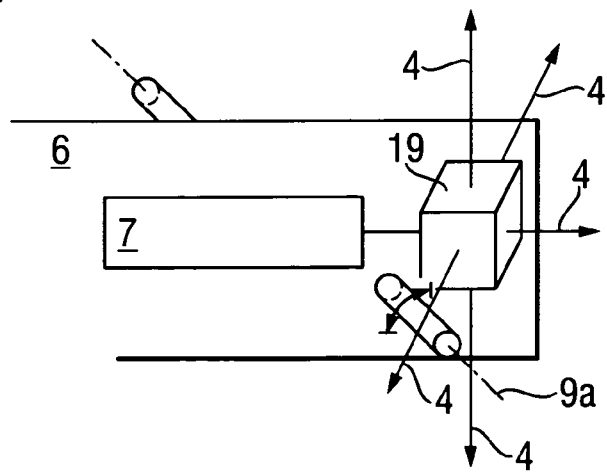

TILTABLE CONSTRUCTION LASER

BACKGROUND OF THE INVENTION

1. Field of the Invention

The invention is directed to a tiltable construction laser, particularly a tiltable rotating construction laser with a laser beam that is moved within a plane at least by segments.

2. Description of the Prior Art

Construction lasers with a fanned out laser beam or with a plurality of laser beams defining a plane and rotating construction lasers with a laser beam that is moved within a plane at least by segments, are used primarily in the building industry to determine horizontal planes, vertical planes, or planes at defined inclinations on walls, ceilings and floors. In this connection, particularly when leveling horizontal planes and vertical planes, strict requirements are imposed for orientation to the earth's gravitational field with maximum deviations of less than 10" (angular seconds) for the total error of the system. The sensors themselves account for about 3" to 5" of this total error. On the other hand, at inclinations relative to the gravitational field of up to 20% or more (depending on the inclination), a maximum deviation of about 50 angular seconds to 200 angular seconds is practically sufficient.

European Publication EP0715707 discloses a multiaxial laser which is oriented to the earth's gravitational field. Two of the five laser beams define a horizontal plane and a vertical plane, respectively. According to U.S. Pat. No. 5,539,990, each individual laser beam is additionally fanned out horizontally and vertically.

According to German Publication DE4406914, a rotating construction laser has a laser unit which is arranged in a mounting frame and whose laser beam can be deflected by approximately 90° by a deflecting device which is supported in a rotating part so as to be rotatable about an axis of rotation intersecting the beam axis of the deflected laser beam. The plane can be tilted in any manner about a swiveling axis in a swiveling plane perpendicular thereto.

In a tiltable rotating construction laser, according to U.S. Pat. No. 6,804,892, having a stationary part that is tiltable about two tilt axes perpendicular to one another, a leveling sensor for highly precise orientation of a tiltable measurement frame to the gravitational field and an angle sensor for highly precise measurement of the angle of inclination are arranged, per tilt axis, between the stationary part and the measurement frame. The measurement frame, as additional tiltable subassembly, is complicated. In addition, the errors of the leveling sensor and angle sensor accumulate to a total error in this indirect determination of inclination.

According to German Publication DE10325859, the plane of the laser beam is tiltable in two swiveling planes which are perpendicular to one another, while the rotatable axle which is supported in a universal ball support in the mounting frame is tilted along with the laser unit and the deflecting device by two actuating drives relative to the housing which is usually oriented horizontally. A stationary part with exactly one integrated bubble leveling instrument can be guided in a positive-locking manner by a tilt guide which is fixedly connected thereto, on two tilt guide contours which are arranged at right angles in the mounting frame. Since only small angles of inclination to the gravitational field can be measured directly by the high-precision bubble leveling instrument, large inclination angles are determined indirectly by a known displacement path of the actuating drives.

In addition, conventional sensors are known that are sensitive to the inclination relative to the gravitational field and are based on bubble leveling instruments which are sensitive in one dimensions or in two dimensions and which have different angular resolutions and tilt measurement ranges, with the angular resolution and tilt measurement range usually being defined relative to one another in opposite directions.

SUMMARY OF THE INVENTION

An object of the present invention is a tiltable construction laser which is simple in terms of technology.

Another object of the present invention is a tiltable construction laser capable of a direct measurement of tilting with large inclination angles.

These and other objects of the present invention which will become apparent herein after, are achieved by proving a construction laser with at least one laser beam defining a plane and having a laser unit, which is tiltable with respect to the laser housing around at least one swiveling axis, at least one leveling sensor which is sensitive to the laser unit inclination for highly precise alignment relative to the gravitational field, and at least one tilt sensor for direct measurement of an inclination angle relative to the gravitational field.

According to the present invention, the inclination to the gravitational field can be directly determined, depending upon the application, with the required accuracy and the necessary value range, in a technologically simple manner by providing two sensors which differ with respect to angular resolution and tilt measurement range, a leveling sensor with a high angular resolution and narrow tilt measurement range, and a tilt sensor with a smaller angular resolution and a broader tilt measurement range.

The laser unit is advantageously tiltable around two tilt axes which are advantageously arranged perpendicular to one another, and sensors which are sensitive to both tilt axes preferably, that are sensitive in two dimensions, are advantageously provided. Thereby, with fixed tilt axes, inclinations of the plane around a virtual tilt axis can also be adjusted.

Advantageously, at least one leveling sensor and at least one tilt sensor are arranged for each tilt axis so as to be sensitive thereto, so that separable sensors which are sensitive in one dimension can be used.

A multiplexer for serial measurement value acquisition is advantageously arranged between the sensors and computing means, which is connected to the sensors so that information can be transmitted therebetween. Thereby, the same evaluating electronics can be used for a plurality of sensors and, in an advantageous manner, for all sensors.

The computing means is advantageously controllably connected to at least one actuating drive for swiveling the laser unit relative to the housing around a swiveling axis so that conventional adjusting algorithms and regulating algorithms of construction lasers can be carried out with respect to the inclination of the plane.

The construction laser is advantageously constructed as a rotating construction laser with a laser beam that is moved within a plane at least by segments so that the plane, which is inclined in a defined manner, is swept by the laser beam at least by segments in timed manner.

The construction laser is advantageously formed as a linear rotational construction laser with at least one laser beam which is fanned out in the plane and which is moved within the plane at least by segments so that the static mark remains visible when the rotation ceases.

Alternatively, the construction laser is advantageously formed as a linear laser with at least one laser beam that is fanned out in the plane so that the plane, which is inclined in a defined manner, can be marked by a static mark (line, row of points, etc.).

Alternatively, the construction laser can be advantageously formed as a multiaxial laser with at least two laser beams defining the plane, so that the plane which is inclined in a defined manner can be marked by individual points (that are visible from a great distance).

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2 a partial schematic view of another embodiment of a construction laser according to the present invention;

FIG. 3 a partial schematic view of further embodiment of a construction laser according to the present invention; and FIG. 4 a partial schematic view of yet another embodiment of a construction laser according to the present invention.

DETAILED DESCRIPTION OF THE PREFERRED EMBODIMENTS

Figure 1:
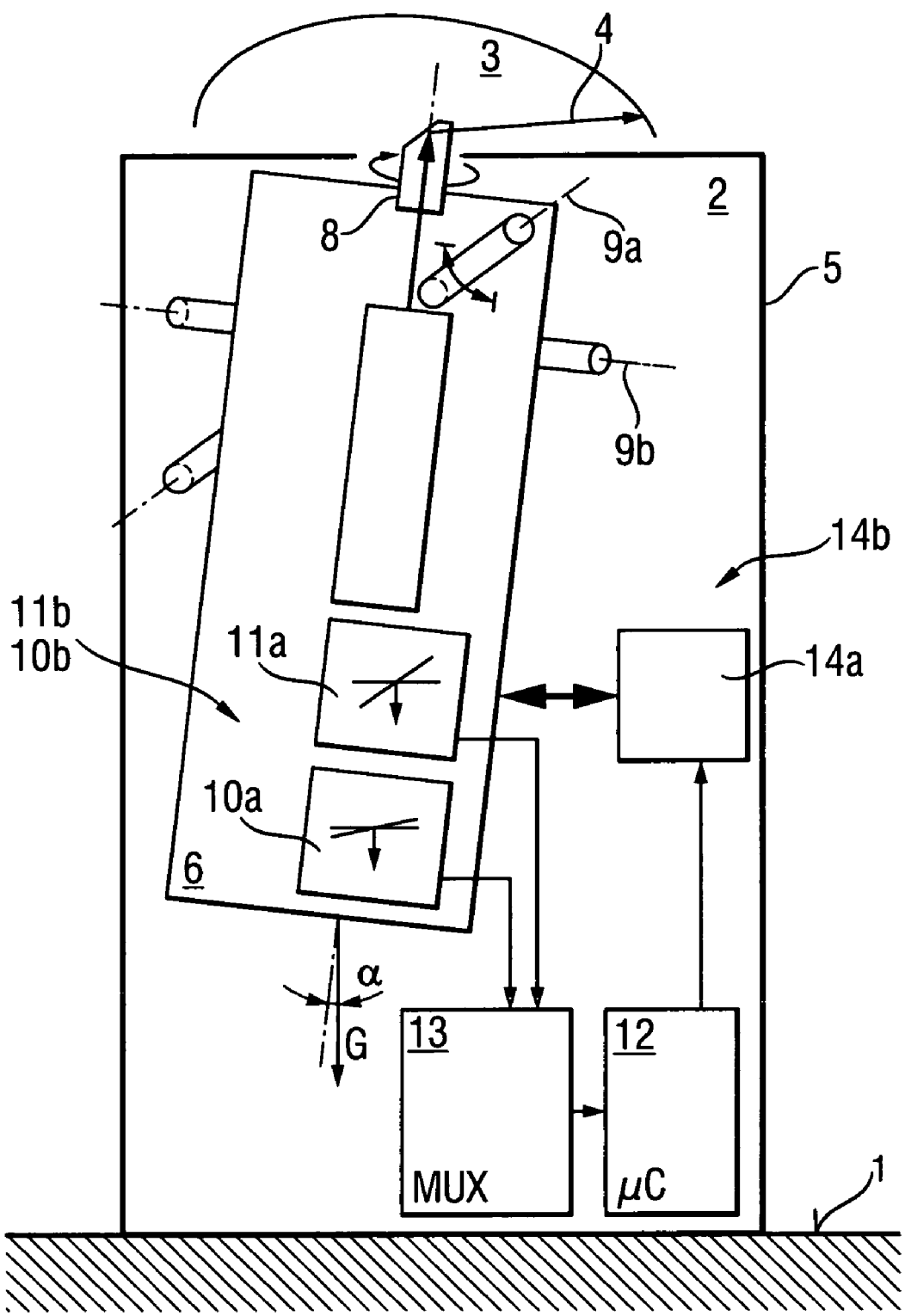
FIG. 1 a schematic view of a construction laser according to the present invention.

According to FIG. 1, a construction laser 2 which is set up on a supporting surface 1 and which is formed as a rotating construction laser with a laser beam 4 which rotates continuously within a plane 3, has a housing 5, a laser unit 6 with a laser light source 7 located in the housing 5, and a rotating deflecting prism 8. The laser unit 6 is tiltable about a swiveling axis 9a with respect to the housing 5. A leveling sensor 10a with a high angular resolution and a narrow tilt measurement range for highly precise orientation to the gravitational field G, and a tilt sensor 11a with a smaller angular resolution and a broader tilt measurement range for direct measurement of an inclination angle [alpha] relative to the gravitational field G are provided in the laser unit 6 so as to be sensitive to the swiveling axis 9a. A multiplexer 13 for serial measurement value acquisition is arranged between the sensors, which are unidimensionally sensitive (leveling sensor 10a and tilt sensor 11a), and computing means 12 connected to the sensors so as to transmit information therebetween and to process measurement values. The computing means 12 in the form of a microcontroller is controllably connected to an actuating drive 14a for swiveling the laser unit 6 relative to the housing 5 about a swiveling axis 9a. The laser unit 6 is tiltable around exactly two tilt axes 9a, 9b which are arranged perpendicular to one another. The sensors which are unidimensionally sensitive to the second tilt axis 9b (leveling sensor 10b and tilt sensor 11b) and the actuating drive 14b, which provides for tilting around the second tilt axis 9b, are arranged perpendicular to the drawing plane and are, therefore, indicated by reference numbers, although not structurally. For further details regarding the design of the tiltable rotating construction laser, the person skilled in the art is referred to U.S. Patent Publication US 2005/0008043 whose disclosure is incorporated herein by reference thereto.

According to FIG. 2, the laser unit 6 of a linear rotating construction laser, which laser unit 6 is tiltable around a swiveling axis 9a, has a rotating head 15 which is rotatable perpendicular to the swiveling axis 9a and which contains the laser light source 7. The laser beam 4 exiting from the laser light source 7 is fanned out by a beamsplitter 16 in a continuous linear beam, which lies within the plane 3 and which (as is shown) also generates a static marking line 17 when the rotating head 15 does not rotate.

According to FIG. 3, the laser unit 6 of a linear laser, which laser unit 6 is tiltable around a swiveling axis 9a, has the laser light source 7. The laser beam 4 exiting from the laser light source 7 is fanned out by a beamsplitter 16 in linear beams which are shown with dash lines, which are oriented perpendicular to one another, and which generates a marking cross 18 shown with a dot.

According to FIG. 4, the laser unit 6 of a multiaxial laser is tiltable around a swiveling axis 9a, also has the laser light source 7. The laser beam 4 exiting from the laser light source 7 is divided by a beamsplitter 19 into five individual beams that are oriented, respectively, perpendicular to one another.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. Construction laser with at least one laser beam (4) defining a plane (3), the construction laser comprising:

a housing (5); and a laser unit (6) arranged in the housing (5) and tiltable relative thereto around at least one swiveling axis (9a), said laser unit (6) having;

at least one leveling sensor (10a), which is sensitive to an inclination of the laser unit (6) for highly precise alignment relative to the gravitational field (G), and at least one tilt sensor (11a), which performs direct measurement of an inclination angle α relative to the gravitational field (G), wherein said at least one leveling sensor and tilt sensor are mounted on said tiltable laser for joint movement therewith and without relative movement to each other.

2. Construction laser according to claim 1, wherein the laser unit (6) is tiltable around two swiveling axes (9a, 9b) and has two additional sensors (11a, 11b), the sensors (10a, 10b, 11a, 11b) being sensitive to both swiveling axes (9a, 9b).

3. Construction laser according to claim 2, wherein at least one leveling sensor (10a, 10b) and at least one tilt sensor (11a, 11b) are arranged for each tilt axis (9a, 9b) so as to be sensitive thereto.

4. Construction laser according to claim 1, further comprising a multiplexer (13) for serial measurement value acquisition arranged between the sensors and computing means (12) for processing the measurement values, the computing means (12) is connected to the sensors so as to transmit information therebetween.

5. Construction laser according to claim 4, wherein the computing means (12) is controllably connected to at least one actuating drive (14a) for swiveling the laser unit (6) relative to the housing (5) around the at least one swiveling axis (9a).

6. Construction laser according to claim 1, wherein the construction laser is formed as a rotating construction laser with a laser beam (4) that is moved within the plane (3) at least by segments.

7. Construction laser according to claim 6, wherein the construction laser is formed as a linear rotating construction laser with at least one laser beam (4) which is fanned out in the plane (3).

8. Construction laser according to claim 1, wherein the construction laser is formed as a linear laser with at least one laser beam (4) that is fanned out in the plane (3).

9. Construction laser according to claim 1, wherein the construction laser is formed as a multi-axial laser with at least two laser beams (4) defining the plane (3).

* * * * *